United States Patent
Ōhashi

[11] Patent Number: 6,136,731
[45] Date of Patent: Oct. 24, 2000

[54] JOINTING TAPE FOR WALL SLABS

[76] Inventor: Yoshirō Ōhashi, 6-15, Heiwa 2-chome, Minami-ku, Fukuoka-shi, Fukuoka-ken, Japan

[21] Appl. No.: 09/079,192

[22] Filed: May 15, 1998

[30] Foreign Application Priority Data

Jan. 24, 1997 [JP] Japan ................................. 9-025911
May 16, 1997 [JP] Japan ................................. 9-143062

[51] Int. Cl.$^7$ .................................................. B32B 7/12
[52] U.S. Cl. .......................... 442/149; 442/151; 428/57; 428/60; 428/343; 428/354; 428/906
[58] Field of Search .................... 442/149, 151; 428/57, 60, 343, 354, 906

[56] References Cited

U.S. PATENT DOCUMENTS

| | | | |
|---|---|---|---|
| 2,208,619 | 7/1940 | Armor et al. | 442/149 |
| 5,691,051 | 11/1997 | Matthews | 428/57 X |
| 5,736,470 | 4/1998 | Schneberger et al. | 442/151 |
| 5,773,114 | 6/1998 | Adams | 428/57 |

*Primary Examiner*—Daniel Zirker
*Attorney, Agent, or Firm*—Browdy and Neimark

[57] ABSTRACT

A jointing tape bonded to a joint between wall slabs has an elongated thin tape portion having at both sides of a back surface thereof alignment faces which are adapted to be bonded to wall surfaces of the wall slabs, respectively. The tape portion is not elasticized in longitudinal and lateral directions thereof. A number of holes is formed in the tape portion. Each of the holes is large enough that putty can pass therethrough. The jointing tape has an elongated thin shielding member having a front surface which is stuck onto a center of the back surface of the tape portion by a first adhesive, and a rear surface which is adapted to be abutted against and cover a space formed in the joint. The shielding member has no hole through which the putty can pass and transparency capable of visibly confirming an opposite side thereof. The jointing tape has a second adhesive applied onto the rear surface of the shielding member and/or onto the alignment faces. An outer surface of the tape portion has no adhesive property.

2 Claims, 7 Drawing Sheets

JOINTING TAPE FOR WALL SLABS

BACKGROUND OF THE INVENTION

1. Field of the Invention

The present invention relates to a jointing tape for bonding wall slabs together, and in particular to a jointing tape having a shielding member which is attached to a joint between two wall slabs so as to cover a space or groove formed in the joint.

2. Description of the Related Art

Conventionally, a wall slab formed into a predetermined dimension, such as a plaster board and an aerated light-weight concrete slab, has been frequently used as an exterior wall or interior wall of buildings. When assembling or joining the wall slabs together, a joint between the wall slabs should be flattened and prevented from being cracked after execution of work.

As shown in FIG. 1 which illustrates a conventional construction method for assembling the wall slabs, the wall slabs A, B are joined together side by side so that taper portions C, D thereof form a V-shaped space or groove F in a joint E therebetween. The space F is then filled with putty G by using a spatula H. In this method, even if the wall slabs A, B are joined together with a slight difference in level, the difference in level is inconspicuously covered or absorbed by the putty G. However, a bonding strength between the wall slabs A, B is relatively low, so a displacement between the wall slabs A, B which causes a crack in the putty G filled in the space F may be easily occurred.

In order to improve the bonding strength between the wall slabs A, B, as shown in FIG. 2 it has been conventionally proposed to use an elongated thin net-like jointing tape J. The jointing tape J is bonded onto the wall slabs A, B by means of an adhesive K so as to cross over the space F, and the putty G is then applied onto an outer surface of the jointing tape J by the spatula H. The space F is filled with the putty G which passes through a large number of meshes or holes of the net-like jointing tape J, and the entire outer surface of the jointing tape J is covered thin with the putty G. Both sides of the jointing tape J is strongly stuck onto wall surfaces of the wall slabs A, B by the putty G which passes through the meshes, and therefore the wall slabs A, B are strongly joined together by the tape J. Thus, the net-like jointing tape J effectively prevents an occurrence of displacement between the wall slabs A and B after execution of work.

However, it is undesirable to fill the space F with the putty G when using the net-like jointing tape J. The space F consumes a large amount of the putty G. The next works such as papering or painting the wall are much delayed because the putty G filled in the space F does not dries up soon. Since the putty G filled in the space F shrinks due to drying, it is difficult to flatten the surface of the putty G by one-time work. Further, it is a troublesome task to stick the jointing tape J onto the wall slabs A, B with the adhesive K.

In FIG. 3, there is shown a jointing tape J to which the adhesive K has been previously applied. In this jointing tape J, the problem is that the adhesive K is applied onto both surfaces of the jointing tape J. The adhesive K applied onto the outer surface of the jointing tape J hinders a smooth motion of the spatula by contacting with the spatula. Further, in order to keep the jointing tape J in a state of being wound into a roll as a bandage, a peeling sheet L put on the outer surface of the jointing tape J is required. Furthermore, the jointing tape J shown in FIG. 3 is also formed into a net, so the putty G enters the space F through a number of meshes of the tape J when applying the putty G onto the outer surface of the jointing tape J.

As shown in FIG. 4, there has been proposed another jointing tape J which has a shielding member M for preventing the putty G from entering the space F. The shielding member M is made of elongated thin stainless steel, and is previously stuck onto an inner surface of the jointing tape J by adhesive N. A width of the shielding member M is longer than that of the space F but shorter than that of the jointing tape J. The jointing tape J is stuck onto the wall surfaces of the wall slabs A, B where adhesive P is previously applied, and the putty G is then applied onto the outer surface of the jointing tape J by means of the spatula. Incidentally, in the case of using the wall slabs A, B as an exterior wall, as shown in FIG. 4, a backup material R and a waterproof sealant S may be filled or interposed between the wall slabs A, B.

The jointing tape J with the shielding member M shown in FIG. 4 prevents the putty G from entering the space F. However, the jointing tape J has the following problems. First, the work for applying the adhesive P onto the wall slabs A, B is required, so construction is troublesome. Second, since the shielding member M is not transparent, it is difficult to align the center of the shielding member M with the center of the space F when sticking the jointing tape J onto the wall slabs A, B. Third, a surface of the shielding member M made of stainless steel is smooth, so the bonding performance between the shielding member M and the putty G is worse. As a result, there may be sometimes the case where the center portion of the jointing tape J floats up.

SUMMARY OF THE INVENTION

It is, therefore, an object of the present invention to provide a jointing tape which easily performs a sticking work by previously applying adhesive onto only an inner surface thereof.

Further, another object of the present invention is to provide a jointing tape having a transparent shielding member so as to easily perform a sticking work.

Further, another object of the present invention is to provide a jointing tape having a shielding member whose surface is not smooth, thereby preventing a center portion of the jointing tape from floating up.

DETAILED DESCRIPTION OF THE PREFERRED EMBODIMENT

Figure 1:
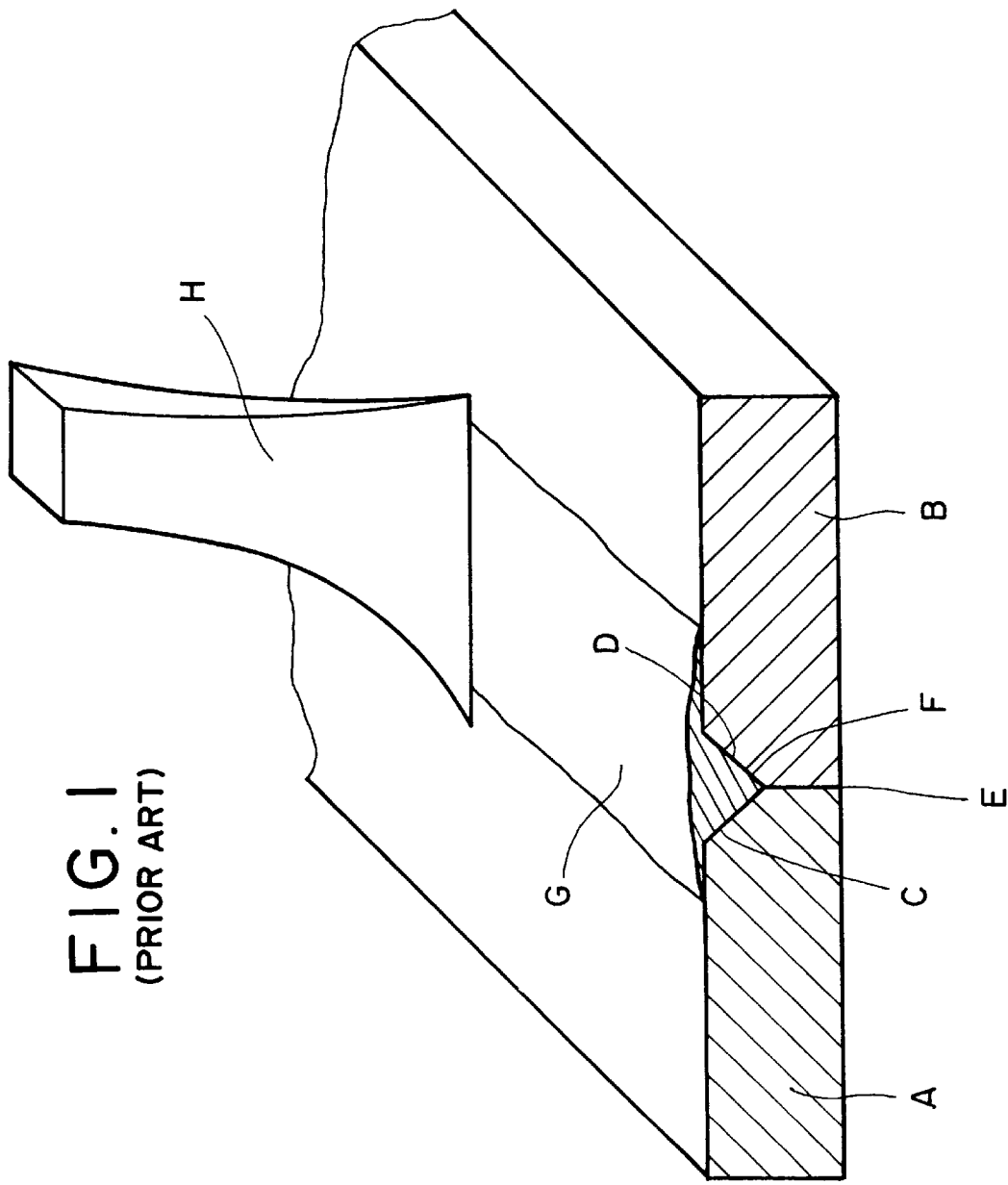
FIG. 1 to FIG. 4 are views showing the prior art such as public knowledge or use.
Figure 2:
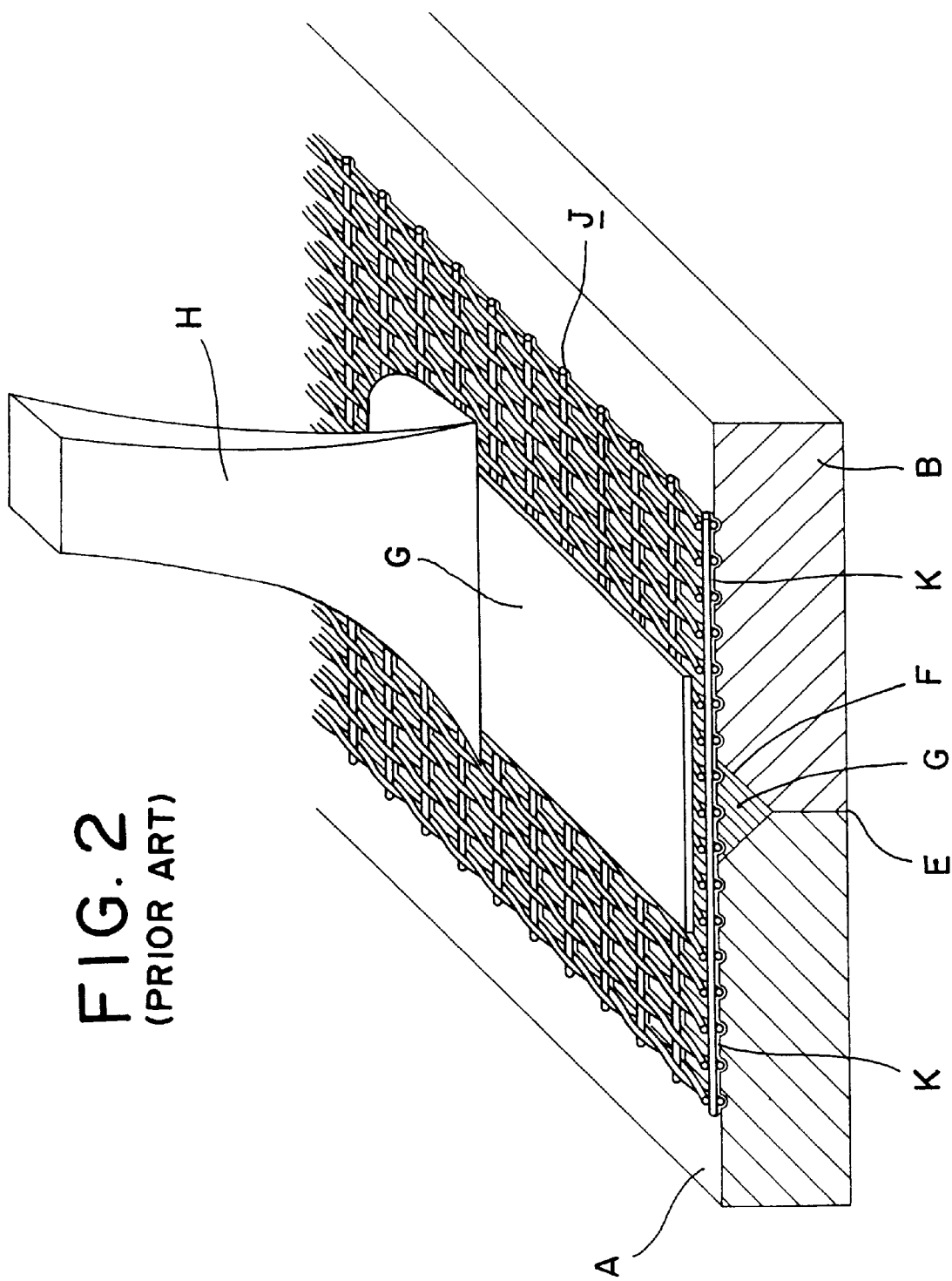
Figure 3:
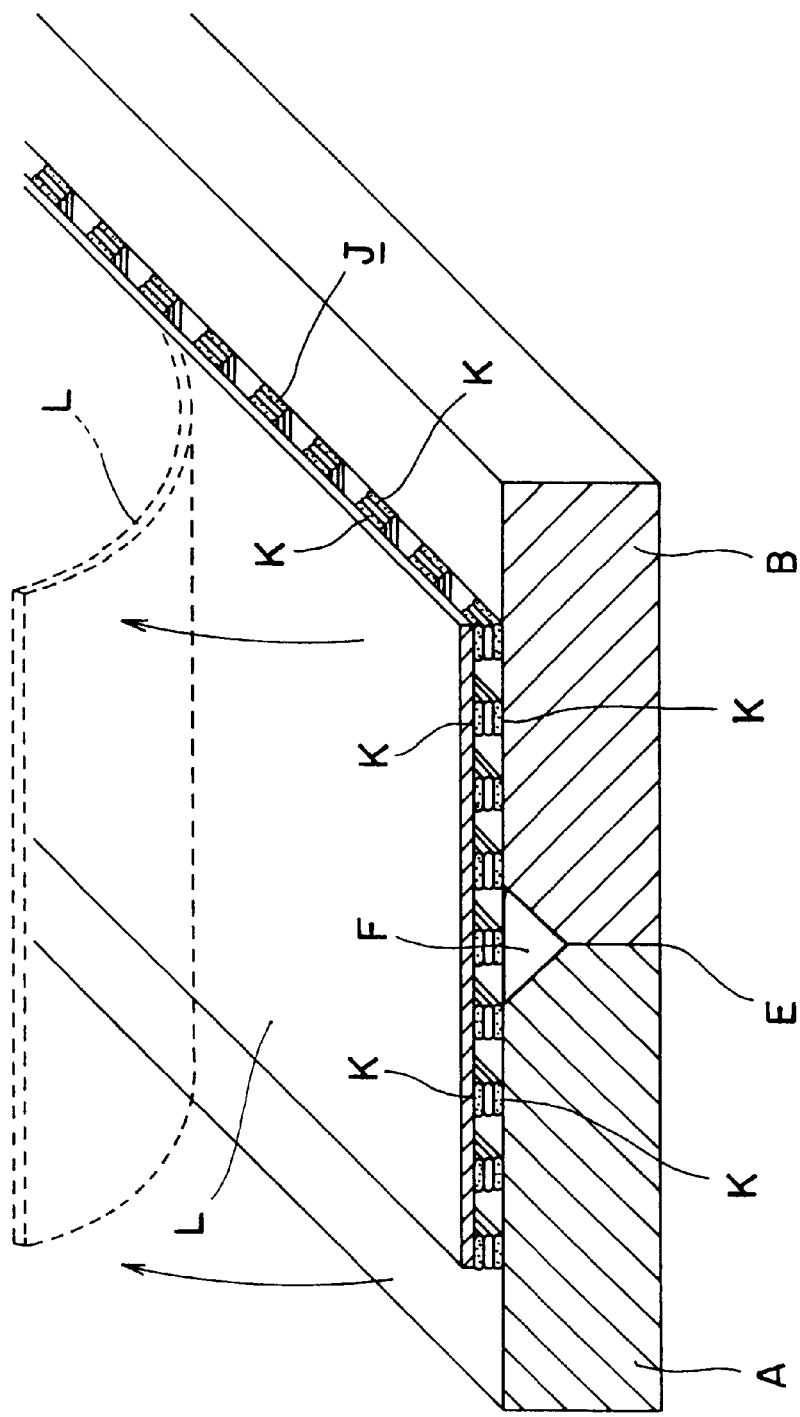
Figure 4:
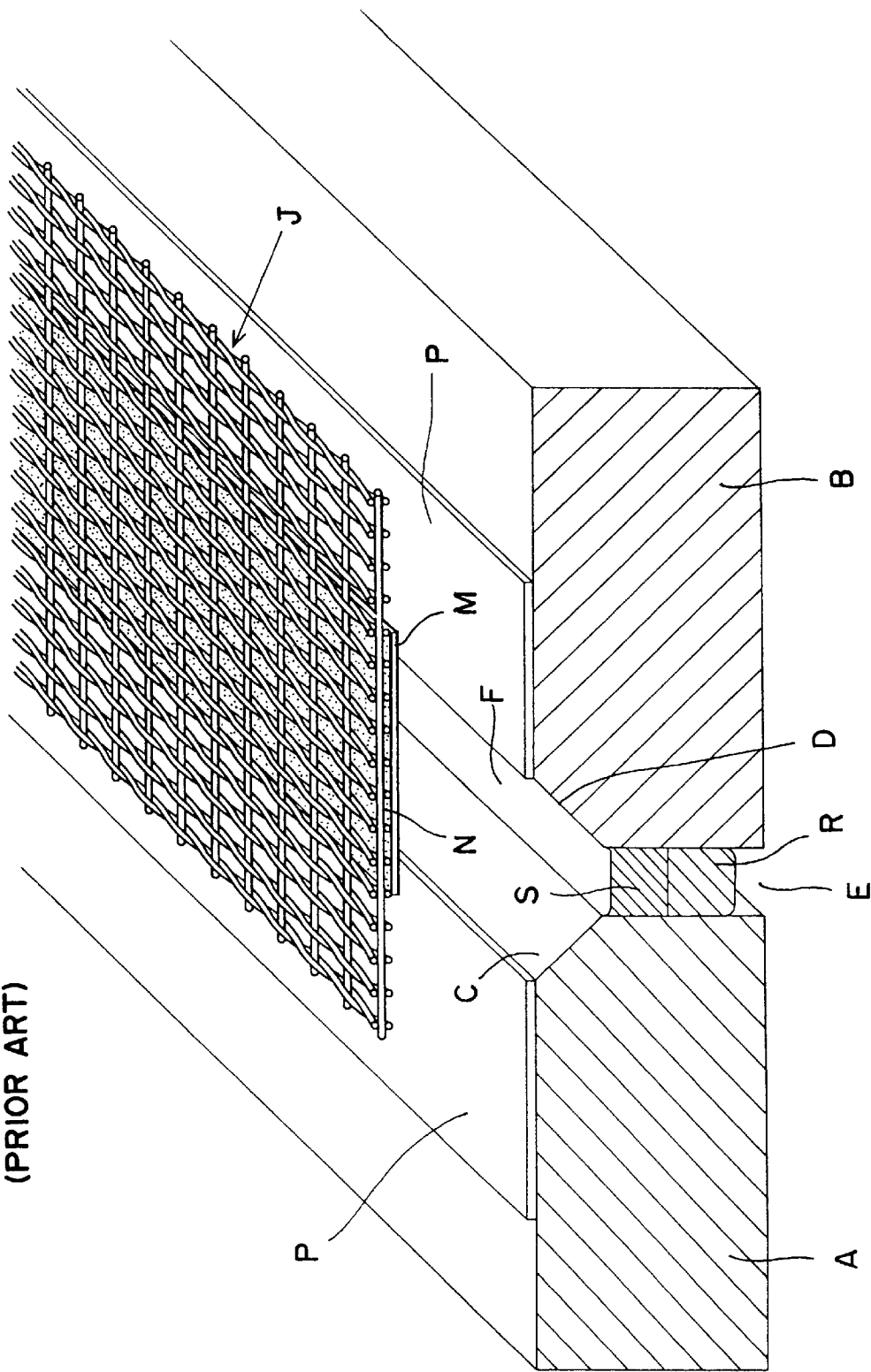
Figure 5:
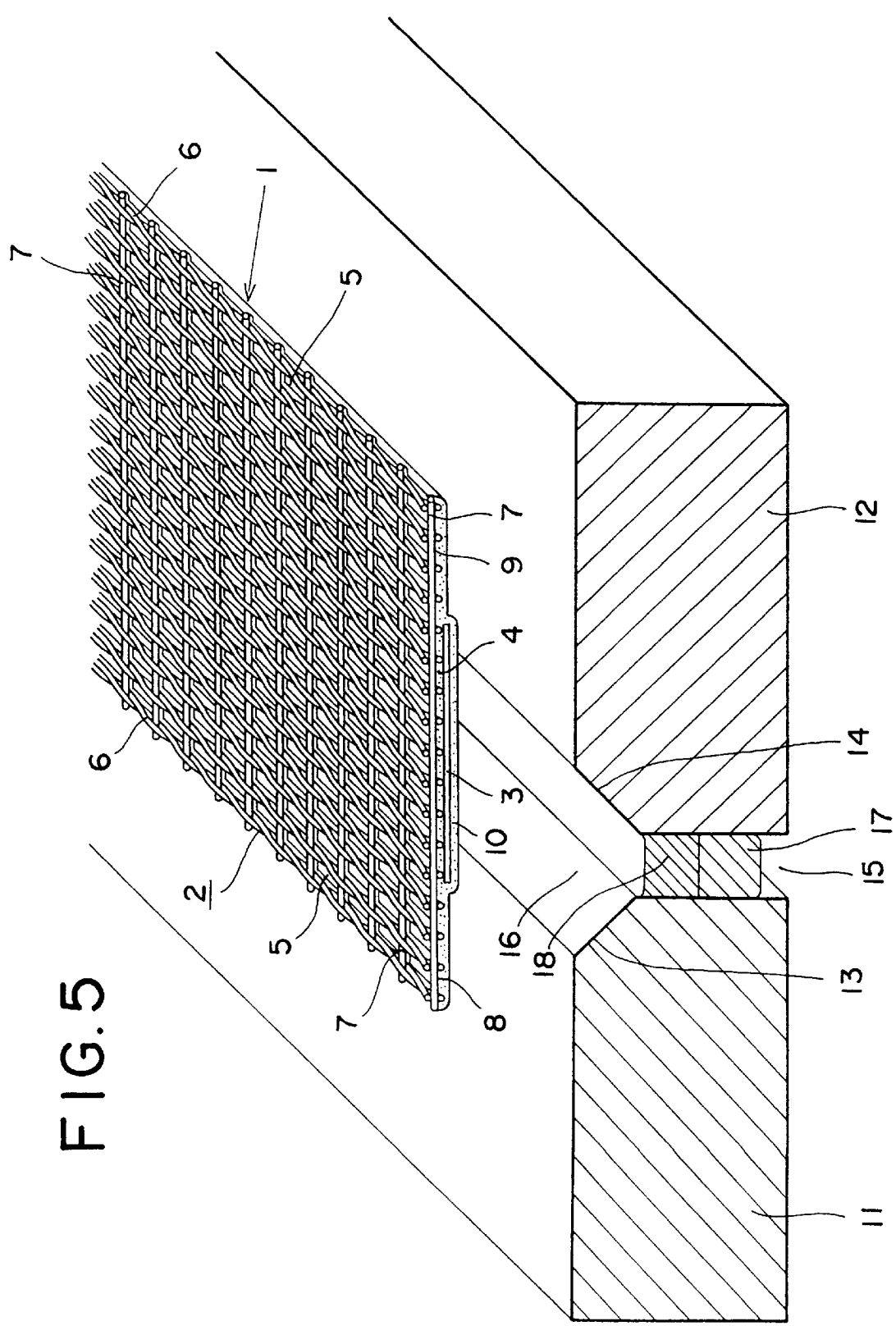
FIG. 5 is a perspective view showing a jointing tape according to the present invention and wall slabs.

One embodiment of the present invention will be described below with reference to the accompanying drawings. An elongated thin jointing tape 1 according to the present invention has a tape portion 2, and a shielding member 3 attached to a back surface of the tape portion 2 by adhesive 4. The tape portion 2 is a woven fabric formed of materials such as aramid fiber and glass fiber which have no possibility of being rusted or deteriorated, a non-woven fabric, or a split fiber non-woven fabric. The split fiber non-woven fabric is a non-woven fabric formed in the following manner: splitting a synthetic resin film such as a polyolefine-based film into yarn-like fibers; multilaying the yarn-like fibers by placing a first group of the yarn-like fibers side by side in a longitudinal direction as warp fibers, placing a second group of the yarn-like fibers side by side in a lateral direction as weft fibers above the first group without weaving, and repeating those; and bonding the longitudinal fibers and the lateral fibers thermally at each of their intersecting portions. The tape portion 2 has a large number of relatively large meshes or holes 5, even in the case where the tape portion 2 is made of either materials. The tape portion 2 shown in FIG. 5 is a net-like woven fabric formed of a warp fiber 6 and a weft fiber 7. The tape portion 2 is not substantially elasticized in the longitudinal direction and the lateral direction.

Materials used as the shielding member 3 are, for example, a film formed of a synthetic resin such as polycarbonate (PC), polyethylene terephthalate (PET), or a woven fabric formed of glass fibers. The shielding member 3 made of film is transparent or semitransparent, and is not substantially formed with holes or meshes. On the other hand, the shielding member 3 made of woven fabric has a lot of holes or meshes considerably smaller than the hole 5 of the tape portion 2. A great many of small holes serves to provide transparency for the shielding member 3 made of woven fabric.

Figure 8:
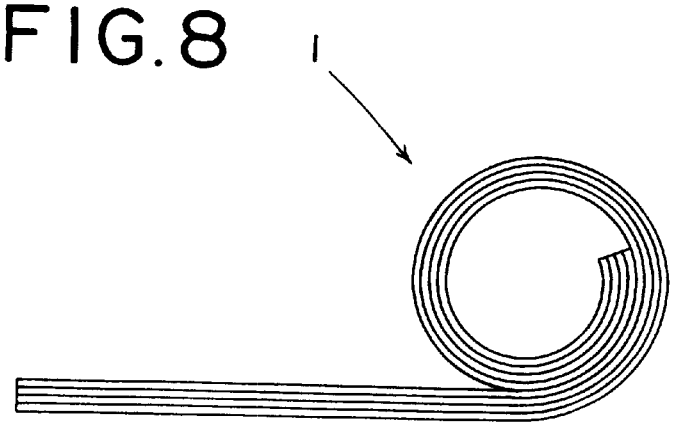
FIG. 8 is a side view showing the jointing tape which is in a state of being wound into a roll.

Alignment faces 8 and 9 are formed on both sides of the back surface of the tape portion 2. Adhesive 10 is previously applied onto an inner surface of the jointing tape 1. The adhesive 10 is preferably applied onto the entire inner surface of the jointing tape 1 including the alignment faces 8, 9 and a rear surface of the shielding member 3. But, the adhesive 10 may be partially applied onto the inner surface of the jointing tape 1 in order to economize on the adhesive 10. No adhesive is applied onto an outer surface of the jointing tape 1. The jointing tape 1 is kept in a state of being wound into a roll, as shown in FIG. 8.

Wall slabs 11 and 12 are joined together side by side so that a V-shape space 16 is formed by taper portion 13, 14 of the slabs at a joint 15 between the wall slabs 11, 12. The wall slab is a plaster board, an aerated light-weight concrete slab, a cement extrusion molding plate, an asbestos cement slate sheet (board), a calcium silicate board, a precast concrete slab, or the like. In the case of using the wall slabs as an exterior wall, as shown in FIG. 5, a backup material 17 and a waterproof sealant 18 are filled or interposed between the wall slabs 11 and 12.

As shown in FIG. 5, the jointing tape 1 is stuck onto wall surfaces of the wall slabs 11, 12 by using the adhesive 10 so that the shielding member 3 covers the space 16 in a manner of riding thereon. At this time, in the case where the shielding member 3 is formed of the synthetic resin film which is transparent or semitransparent, it is possible to confirm the position of the space 16 through the shielding member 3. Therefore, the center of the shielding member 3 can be readily aligned with the center of the space 16. On the other hand, in the case where the shielding member 3 formed of glass fiber is used, it is possible to obtain the lowest limit transparency by the great many of the small holes of the shielding member 3. Therefore, the center of the shielding member 3 can be also readily aligned with the center of the space 16. Further, the adhesive 10 is previously applied onto the inner surface of the jointing tape 1, so that the sticking work can be readily performed. Further, no adhesive is applied onto the outer surface of the jointing tape 1, so that the jointing tape 1 is not stuck to worker's hands and a work for stretching a sag in the jointing tape 1 can be readily performed.

Figure 6:
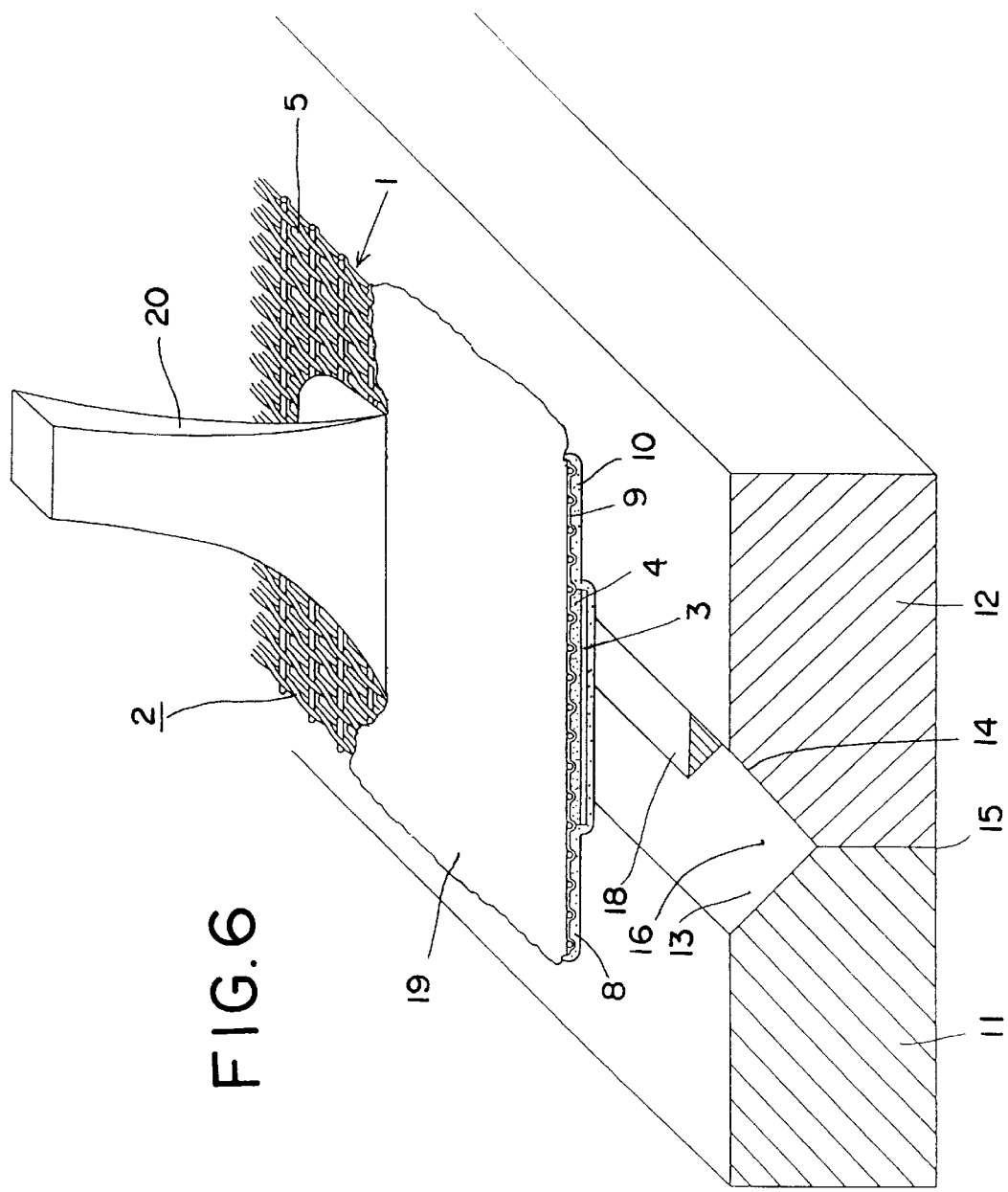
FIG. 6 is a perspective view showing a state that putty is applied onto an outer surface of the jointing tape shown in FIG. 5.
Figure 7:
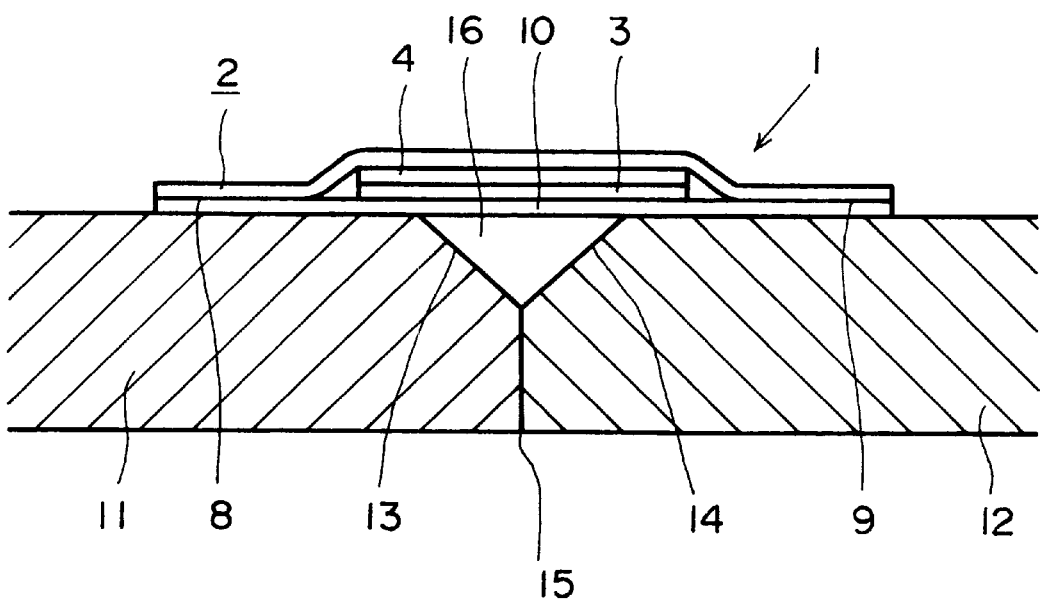
FIG. 7 is a partially cross-sectional view of the jointing tape and wall slabs.

As shown in FIG. 6, putty 19 is applied onto the outer surface of the jointing tape 1 by using a spatula 20 after the jointing tape 1 is stuck. Then the putty 19 enters the meshes or holes 5 of the tape portion 2 and is bonded onto the wall surfaces of the wall slabs 11, 12, thereby the jointing tape 1 is more strongly bonded onto the wall slabs 11 and 12. At this time, since the shielding member 3 which closes the space 16 is attached to the center portion of the back surface of the tape portion 2, the putty 19 can be prevented from entering the space 16. Each hole of the shielding member 3 formed of glass fiber is small enough to substantially prevent the putty 19 from passing through it. Further, no adhesive is applied onto the outer surface of the jointing tape 1, so that the motion of spatula 20 is not hindered.

Moreover, the shielding member 3 formed of woven fabric such as glass fiber has a non-smooth surface and is rough, so that the shielding member 3 is preferably bonded together with the putty. Therefore, it is possible to preferably prevent the center portion of the tape portion 2 from floating up.

Next works such as papering or painting the wall may be performed onto the wall slabs 11 and 12 to which the putty 19 has been applied.

What is claimed is:

1. A jointing tape adapted to be bonded to a joint between wall slabs, comprising:

an elongated thin tape portion having, on both sides of a back surface thereof, alignment faces which are adapted to be bonded to wall surfaces of the wall slabs, said tape portion being not elasticized in the longitudinal and lateral directions thereof;

a number of holes formed in the tape portion, each of the holes being large enough that putty can pass therethrough;

an elongated thin shielding member of a woven fabric having a front surface which is stuck onto a center of the back surface of the tape portion by a first adhesive, and a rear surface which is adapted to be abutted against and cover a space formed in the joint, said shielding member having no hole through which the putty can pass and transparency capable of visibly confirming an opposite side thereof;

a second adhesive applied onto the rear surface of the shielding member and/or onto the alignment faces;

wherein an outer surface of the tape portion is non-adhesive.

2. A jointing tape adapted to be bonded to a joint between wall slabs, comprising:

an elongated thin tape portion having, on both sides of a back surface thereof, alignment faces which are adapted to be bonded to wall surfaces of the wall slabs, said tape portion being not elasticized in the longitudinal and lateral directions thereof;

a number of holes formed in the tape portion, each of the holes being large enough that putty can pass therethrough;

an elongated thin shielding member of glass fiber having a front surface which is stuck onto a center of the back surface of the tape portion by a first adhesive, and a rear surface which is adapted to be abutted against and cover a space formed in the joint, said shielding member having no hole through which the putty can pass and transparency capable of visibly confirming an opposite side thereof;

a second adhesive applied onto the rear surface of the shielding member and/or onto the alignment faces;

wherein an outer surface of the tape portion is non-adhesive.

* * * * *